Nov. 4, 1958 — W. A. AYRES — 2,859,292
MOTOR SPEED CONTROLLER
Filed June 7, 1954 — 2 Sheets-Sheet 1

INVENTOR.
WALDEMAR A. AYRES
BY Hudson, Boughton,
Williams, David & Hoffmann
ATTORNEYS Nov. 4, 1958 W. A. AYRES 2,859,292
MOTOR SPEED CONTROLLER
Filed June 7, 1954 2 Sheets-Sheet 2

INVENTOR.
WALDEMAR A. AYRES
BY Hudson, Boughton,
Williams, David & Hoffman
ATTORNEYS

United States Patent Office 2,859,292
Patented Nov. 4, 1958

2,859,292

MOTOR SPEED CONTROLLER

Waldemar A. Ayres, Lakewood, Ohio, assignor to White Sewing Machine Corporation, Cleveland, Ohio, a corporation of Delaware Application June 7, 1954, Serial No. 435,010

24 Claims. (Cl. 200—61.46)

The present invention relates to automatic speed control devices and, more particularly, to an automatic speed control device used in the drive to various apparatus, as for instance a sewing machine.

It is an object of the present invention to provide a new and improved device for controlling the speed of a drive motor for various apparatus, as for instance sewing machines, accurately over a wide range of speeds such that the apparatus will operate at a substantially constant speed regardless of variable work conditions being performed by the apparatus.

Another object of the invention is to provide a speed controller for a electric drive motor for an apparatus which enables the motor to drive the apparatus at various selected uniform operating speeds throughout a wide speed range from minimum to maximum and with the energization of the motor for operating the apparatus at any selected operating speed always being at full line voltage, wherefore the motor produces requisite operating torque regardless of the selected speed of operation of the apparatus.

It is a further object of the invention to provide a speed controller which can be used in conjunction with an electric drive motor to maintain its speed substantially constant at various selected speeds over a wide range of speeds which the motor is called upon to deliver.

It is a more specific object of the present invention to provide a motor speed controller including an electric switch of the make-and-break type for the power supply circuit to an electric motor and to provide in combination therewith means highly sensitive to speed changes at both the minimum and maximum limits of a wide speed range for operating the above switch.

Another object of the invention is to provide in a speed controller for a drive motor a speed sensitive device which functions efficiently at very low speeds as well as at high speeds and thus enables the drive motor to drive an apparatus at various selected uniform speeds throughout a wide speed range from minimum to maximum operating speed of the apparatus.

It is another object of the invention to provide a speed-sensitive element for operating the speed control device of a drive motor which element utilizes the viscosity of a substance to provide from the low to high limits of a wide speed range a frictional drag or torque between a motor actuated driving element and a floating switch actuating driven element.

The invention resides in certain novel constructions and combinations and arrangements of parts, and further objects and advantages will be apparent to those skilled in the art to which it relates from the following description of the embodiments of the invention described with reference to the accompanying drawings forming a part of this specification in which like reference characters designate like parts, and in which.

Figure 5:
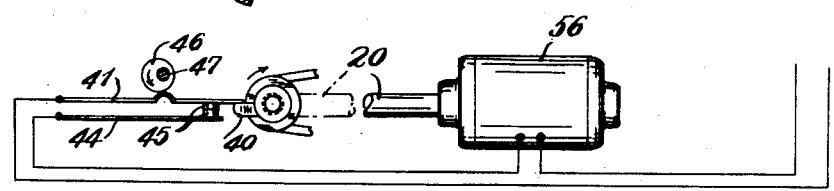
Fig. 5 is a wiring diagram showing an electric circuit to a drive motor for an apparatus and the motor speed controller of the present invention arranged in said circuit.
Figure 6:
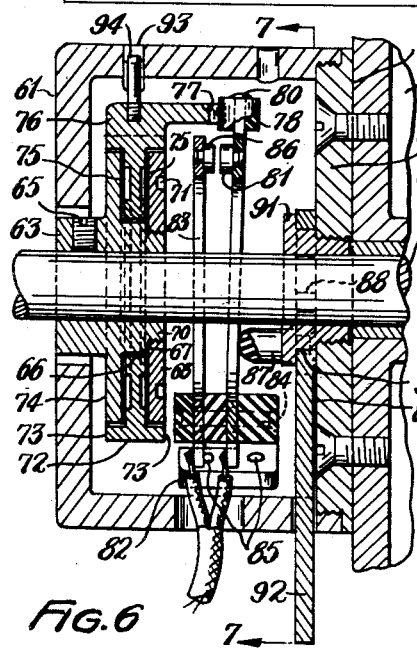
Figure 7:
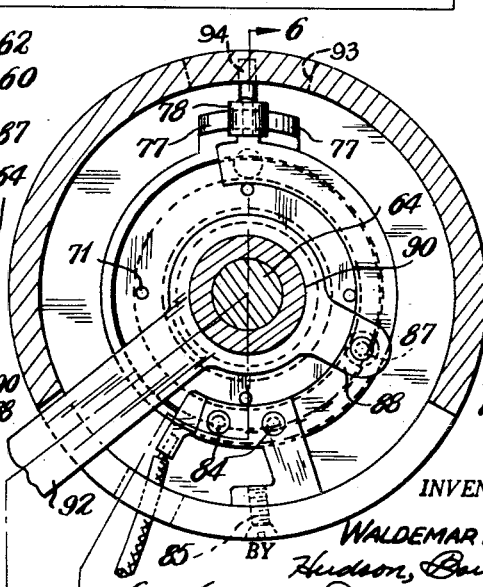
Figure 8:
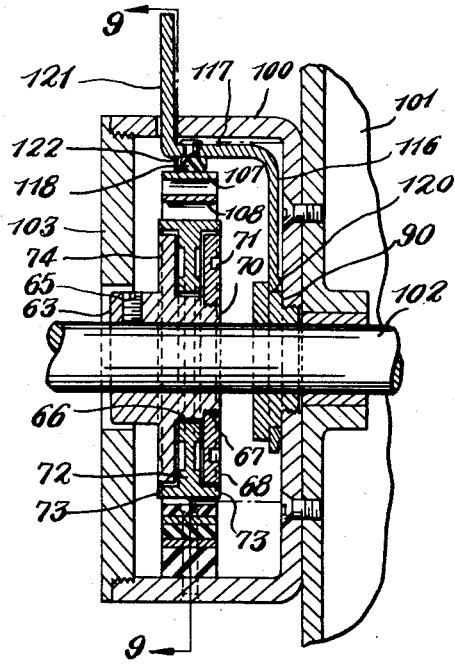
Figure 9:
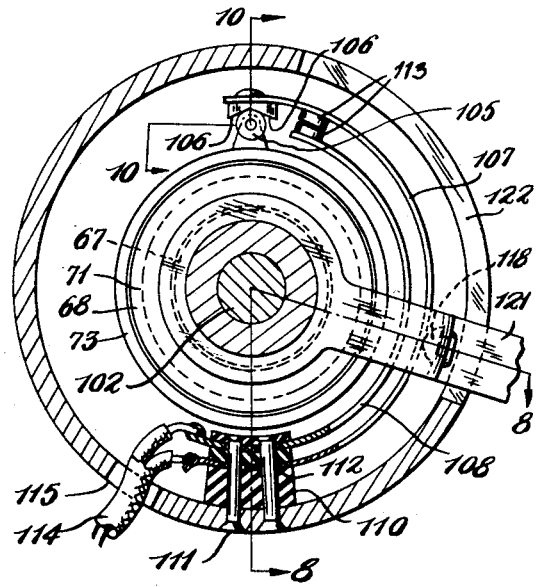
Figure 10:
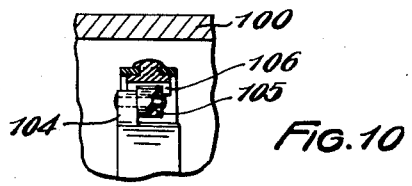
Figure 11:
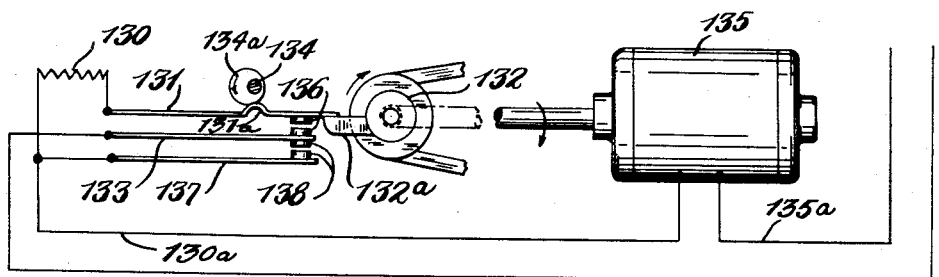

Fig. 6 is a cross-sectional view of a second embodiment of the invention and which is responsive to both clockwise and counterclockwise rotation of a shaft and which is shown mounted directly to the housing of an electric motor the speed of which it controls and with the speed responsive device directly on the motor shaft or spindle, the view being taken approximately on the irregular line 6—6 of Fig. 7;

Fig. 7 is a cross-sectional view taken approximately on the line 7—7 of Fig. 6;

Fig. 8 is a cross-sectional view of a third embodiment of the invention and which is responsive to both clockwise and counterclockwise rotation of an electric motor the speed of which it controls but which embodiment is so constructed and arranged as to be compact and project a minimum distance axially of the motor spindle, and which view is taken approximately along the irregular line 8—8 of Fig. 9;

Fig. 9 is a cross-sectional view taken approximately on the line 9—9 of Fig. 8;

Fig. 10 is a fragmentary cross-section taken along the line 10—10 of Fig. 9 and showing the roller of the speed responsive device and the cam surface of the control switch which cooperates with the roller to actuate the switch contacts to maintain the motor speed uniform at the selected speed; and Fig. 11 is a wiring diagram of the circuit to an electric drive motor similar to Fig. 5 but with the circuit including a different speed control switch and which circuit, after it is initially closed, permits a reduced amount of electricity to flow during the break periods produced in response to changes in motor speed.

As hereinbefore stated, the present invention relates to a speed controller for a drive motor, electric or fluid, comprising generally an electrical switch or a valve operated by a speed-sensitive device which may utilize the viscosity of a fluid or a material having torque transmitting properties to provide a frictional drag or torque between a driving motor actuated element and a driven switch operating floating element.

The first embodiment of the present invention provides a speed controller which can be adapted for use with revolving shafts generally, and as indicated in Figs. 1–5, is shown and will be described without limitation and solely for illustrative purposes as being coupled to the end of the belt-driven shaft of a sewing machine and which shaft is driven by an electric motor. The particular shaft 20 shown in the Fig. 1 has a pulley 21 secured to or formed integrally with the shaft 20 and is shown driven by a V-belt 22 driven from a drive motor. Projecting axially and concentrically from the pulley is a boss 23 having a smooth, annular end surface 24 which forms one surface of an annular groove which is rectangular in cross-section, as will be hereinafter described. The remaining surfaces of the groove are formed by a shaft extension member 25 having a cylindrical body or hub portion 26 that forms the bottom of the groove and an enlarged circular flange portion 27 that forms the remaining side surface of the groove. The shaft extension member 25 is attached and accurately aligned concentrically to the pulley shaft by means of an axial projection 28 which fits into a counterbore 30 in the end of the pulley shaft and the shaft extension is held in place by means of an axially positioned machine screw 31 which threadably engages the pulley shaft 20. The structure containing the annular groove of rectangular cross-section and which includes the shaft extension member 25 and the boss 23 on the pulley will be hereinafter referred to as the driving element of the speed-sensitive device. The driven element of the speed responsive device is located in the annular groove.

The driven element of the device comprises a floating ring-shaped member 32 whose inner diameter 33 is slightly larger than the cylindrical body or hub portion 26 of the shaft extension member 25 forming the bottom of the above-referred to annular groove and whose axial dimension is slightly less than the width of the above-referred to groove. The outer circumference of the ring-shaped member is formed with a T-shaped circumferential flange 34 which overlaps the outer cylindrical surfaces of the pulley boss 23 and the flange 27 of the shaft extension member 25, respectively. The opposite sides 35 and 36 of the ring-shaped member 32 constituting the floating driven element of the speed responsive device are provided with annular grooves or channels 37, the purpose of which will later be pointed out.

The structure described above provides a T-shaped disk or ring constituting the floating driven element and seated in a groove of the driving element such as to have substantially a limited floating fit in all directions on all of its surfaces that are juxtaposed to surfaces of the driving element. According to the principles of the present invention, a substance having viscous properties, such as grease, oil, or even a gas, is placed or introduced between said juxtaposed surfaces of the driving and driven elements of the device. The substance also is introduced into the grooves or channels 37 of the floating driven element. The shaft is rotated and because of the viscous properties of the inserted substance, a moving force or torque is transmitted through the substance from the driving element to the floating driven element and which force or torque rotates the latter even at low speeds of the shaft and proportionally to the angular velocity of the shaft. This force varies with the speed of the shaft and driving element and the movement or torque produced in the floating driven element can be used to operate any suitable control device such as an electrical switch if an electric drive motor is to be controlled or the control valve of a fluid drive motor, the speed of which is to be controlled. The device is extremely sensitive and it has been found that the floating driven element responds to very low speeds as well as to high speeds and thus the device is effective and efficient for speed control purposes over a wide speed range from a very low minimum to a very high maximum.

The embodiment shown in Figs. 1 through 5 has an arm 40 attached to the driven element 32 so as to project beyond its circumference. This arm is opposed as to movement in one direction by one end of a flat, blade-like spring member 41 whose other end is clamped between the segments of an insulating block 42 by means of machine screws 43. A second flat, blade-like spring member 44 is also clamped between the segments of the insulating clock 42 in a position underneath and parallel to the first-mentioned spring member. A pair of contacts 45 is mounted on and between the blades such that one contact is carried by the bottom surface of the upper blade and the second contact is carried by the upper surface of the bottom blade to form an electrical switch of the make-break type.

Opposing the movement which may be produced in the spring member 41 by arm 40 on the driven element is a cam 46 mounted on a cam shaft 47 rotatably carried by the frame of the apparatus. One end of the shaft 47 is formed with an integral disk 48 which contains threads 50 on its outer circumference and which also contains a flat axial projection 51 of rectangular cross-section. A regulating or control shaft or lever 52 having a 90 degree bend is attached to the cam shaft 47 and can be rocked by the knee of an operator of the apparatus. The abutting end of the control lever terminates in a flange 53 and has a slot 54 milled across its end face to receive the cam shaft's rectangular projection 51. A knurled nut 55 slips over the flange 53 of the control lever and is screwed onto the threaded flange 48 of the cam shaft to lock the control lever in place. In this manner a readily detachable coupling structure is provided between the knee-operated control lever and the cam shaft. A spring 52a holds lever 52 and cam shaft 47 normally in such position that contacts 45 are in their most separated condition and spring arm 41 just bears against the lowest portion of cam 46. Movement of lever 52 against the action of spring 52a brings higher portions of cam 46 into contact with the spring arm to close contacts 45 and start rotation of the motor 56, the circuit to which includes the members 41 and 44. As stated above, the torque transmitted to the floating driven element from the driving element varies proportionally with the speed of rotation of the latter, such that when a speed is reached which exceeds the speed setting of cam 46, spring arm 41 is flexed upwardly by arm 40 about bowed portion 41a as a fulcrum to separate contacts 45 and interrupt the circuit to the drive motor. The driving motor thus being de-energized thereupon slows down to the selected speed at which time contacts 45 will again close and the cycle is repeated.

It will be noted that even very low speed rotation of the driving element immediately applies torque to the driven element wherefore the speed responsive device functions sensitively so the speed controlled operates efficiently over a wide range of speeds from an extremely low minimum to a high maximum. Also energization of the motor is always at full voltage assuring requisite operating driving torque being applied to the apparatus.

A second embodiment of the present invention is shown in Figs. 6 and 7. The embodiment shown in these views is made for the direct connection of the driving element of the speed responsive device to the spindle 64 of an electric motor 60. The speed controller of this embodiment includes a fixed cup-shaped housing 61 whose open end is screwed or otherwise secured to a circular plate 62 which is bolted to the housing of the motor 60. The driving element of the speed responsive device of this embodiment is formed in two parts: an outer hub portion 63 containing a circular flange 74 from whose inner surface extends a cylindrical section 66 forming one side and bottom, respectively, of the element's annular receiving groove; and an inner disk portion 68 forming the inner side of the groove. The hub portion 63 is secured to the motor spindle or shaft 64 by suitable means, such as set screw 65, causing the hub to rotate therewith. The inner disk portion 68 is attached to the driving element by means of an axially extending threaded boss 70 projecting from the cylindrical section 66 and onto which the disk 68 is screwed. Disk 68 is accurately positioned relative to hub 63 by means of shoulder 67 at the inner end of cylindrical section 66 and may be tightened by a spanner wrench which engages holes 71 in the face of the disk.

In the receiving groove thus provided in the driving element is positioned the floating driven element of the speed responsive device. The driven element of the present embodiment is similar to that of the preceding embodiment and comprises a ring-shaped member 72 whose inner diameter is slightly larger than the cylindrical section 66 of the hub which forms the bottom of the receiving groove. The outer circumference of the ring-shaped member 72 is formed with a T-shaped circumferential flange 73 which overlaps the outer cylindrical surfaces of the circular flange 74 and the inner disk 68. The opposite sides of the floating ring-shaped driven element 72 of the speed responsive devices are provided with annular grooves or channels 75, the purpose of which will be understood.

Proper clearances are provided between the adjacent surfaces of the driving element and the floating driven element which, as in the previous embodiments, will vary between .002 and .003 of an inch for oils having a viscosity approximately that of three-in-one oil. In the embodiment shown, a clearance of .002 inch was found acceptable for the cylindrical surfaces between the driving and driven elements, and .0025 inch was provided for the annular spaces on each side of the element 72. As in the preceding example, annular grooves 75 of approximately .005 inch deep are provided on each annular face of the element 72 for an oil or grease reservoir. The floating ring-shaped driven element 72 of this embodiment is, therefore, quite similar to that of the first embodiment but has its projecting arm 76 at its outer circumference extending axially with relation to the shaft of the motor. The end surface of the arm is provided with a substantially V-shaped cam surface 77 engaging a cam follower roller 78 when the driven element is rotated in either a clockwise or counterclockwise direction. Cam follower roller 78 is carried on a radial projection 80 adjacent one end of an arcuate, flat, blade-like spring 81 which is positioned concentric with the shaft of the motor 64 and which is supported at its other end by an insulating block structure 82. A second segmental, flat, blade-like spring 83 is positioned substantially parallel to and intermediate said first spring and the speed responsive device, and is also carried by the insulating block structure 82. The insulating block structure 82 is composed of three portions between which are clamped the above-referred to springs by means of rivets 84 which extend through holes in each of the spring elements and through the segments of the insulating block structure. The holes in the spring elements are of slightly larger diameter than the body of the rivets in order that contact between the springs and the rivets will not be established. The insulating block structure 82 described above is, in turn, mounted on the housing 61 of the device by means of machine screws 85. A pair of contacts 86 is carried by the springs adjacent their free ends, the contacts being attached to the springs on their adjacent sides. The spring 81 is inclined or biased slightly toward the motor 60 in a manner providing a cam surface against which a pressure point 87 bears to urge the contact on the spring 81 toward its cooperating contact. The pressure point 87 is, in turn, carried by an annular speed selecting member 88 mounted coaxially about the shaft of the motor by means of a bushing 90. Bushing 90 threadably engages circular plate 62 and holds the speed adjusting member 88 in place as by means of a flange 91 on the outer end of the bushing. Numerous holes or openings are provided in the cup-shaped housing, one of which is in the form of an arcuate slot positioned over the speed selecting member 88 such that its handle 92 can be moved from externally of the housing. A second arcuate slot 93 in the housing 61 is located over the driven element 72 so as to receive a pin 94 threadably fastened to the element 72 to confine its movement within the range of the V-shaped cam surface 77.

The operation of this device is similar to that of the first embodiment excepting that in this case, shaft rotation in either direction operates the switch. As the speed of the driving element increases above the speed corresponding to the setting of the speed adjusting member 88, the driven element rotates slightly to cause the spring's cam follower to separate the contacts. Where, as in the previous embodiment, these contacts supply electricity to a driving motor, the driving motor will slow down sufficiently to permit the contacts to close. These contacts again permit electricity to flow to the motor and the cycle is repeated.

A third embodiment of the present invention is shown in Figs. 8, 9 and 10 of the drawings and is adapted for use in those applications where there is a limited amount of axial clearance adjacent the end of the motor in which a speed control switch can be mounted.

The speed control device of this embodiment is encased in a cup-shaped housing 100, the bottom of which is bolted to the end surface of the motor 101. The shaft of the motor 102 extends axially through the body of the cup and its removable flat, disk-shaped outer end closure 103 which is threadably attached into the outer end of the cup.

The major difference in structure between this embodiment and the preceding one lies in the positioning and construction of the switch element. The major portion of the driving and driven elements of the speed-responsive device is similar to that of the preceding embodiment. The parts of these elements which are identical to the preceding embodiment have been given the identical reference character and the description of these parts will not be repeated here. The driven element of this embodiment contains a short radially extending arm 104 on its outer circumference to which mounts a cam follower roller 105 made from plastic-impregnated fiber or other suitable insulating material. The cam roller is engaged by a V-shaped cam surface 106 which is mounted on the under surface of an outer blade element 107 of an electrical switch. The electrical switch is composed of an outer semicircular blade-like spring element 107 and an inner semicircular blade-like spring element 108, which are spaced radially apart and are positioned about the speed-responsive element in substantially concentric relationship. The blades are held at their lower end between segments of an insulating block 110 whose segments are held together and are fastened to the cup-shaped housing 100 by means of rivets 111. Slightly oversized holes 112 are made in the spring elements to prevent electrical contact by the rivets. A pair of electrical contacts 113 are positioned between the switch blades adjacent the cam surface 106, one being fastened to the outer surface of the inner blade 108 and the other being fastened to the inner surface of the outer blade 107. A pair of electrical lead wires 114 extend through a hole 115 in the housing 100 and are connected to respective fixed ends of the above-described spring elements 107 and 108 which, with their contact elements 113, constitute a make and break-type electrical switch. The speed adjusting member of this embodiment comprises a Z-shaped arm 116 whose center horizontal section 117 overlies the outer spring 107. The under surface of this horizontal section carries a pressure point 118 adapted to bear against the outer surface of the spring 107 which is bowed outwardly slightly from its fixed end to form a cooperating cam surface. The inner end 120 of the speed adjusting lever is rotatably mounted about the motor shaft 102 by means of housing 90, which is identical to that of the preceding embodiment. The outer end 121 of the lever 116 extends through a slotted opening 122 in the housing so that it can be controlled externally of the housing.

The device operates in a similar manner to that of the previous embodiment and may be summarized by saying that increased speed of the speed-sensitive device's driving element in either direction rotates the driven element's cam follower slightly to open the contacts 113 of the switch, whereupon the driving motor slows down until the contacts again make contact with each other, whereupon the cycle is repeated.

Figure 1:
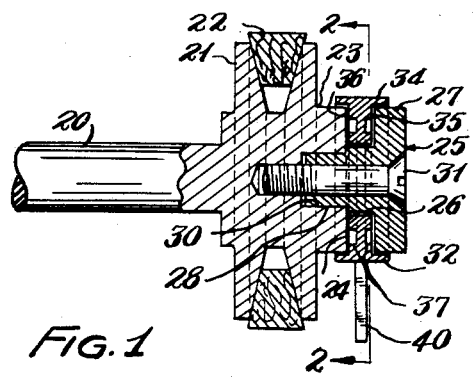
Fig. 1 is s sectional view of a belt driven shaft to which the speed-sensitive device of the speed controller of the present invention is attached.
Figure 2:
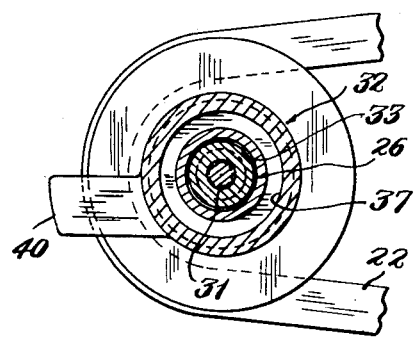
Fig. 2 is a sectional view taken on the line 2—2 of Fig. 1.
Figure 3:
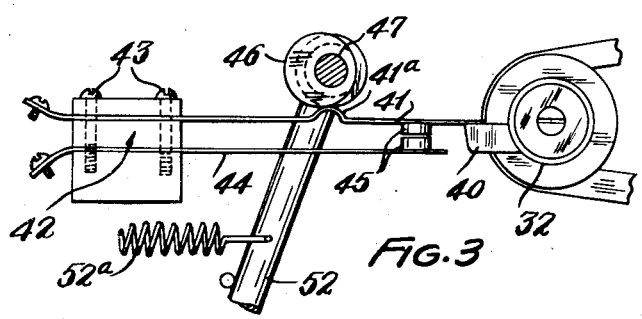
Fig. 3 is an end elevational view of an electric switch controlled by the speed sensitive device shown in Fig. 1 and containing means for selecting various speeds from minimum to maximum throughout a wide speed range.
Figure 4:
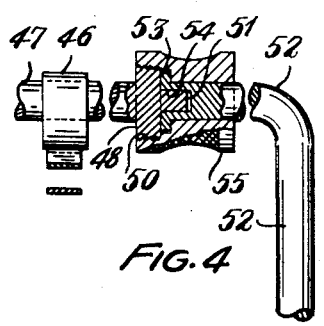
Fig. 4 is an elevational view partly in section of the cam and lever arrangement shown in Fig. 3 for selecting the various speeds.

Fig. 11 illustrates an embodiment of the invention that is similar to the embodiment shown in Fig. 3, but wherein three switch blades are employed in place of the two switch blades of Fig. 3.

In the construction shown in Fig. 11 a switch blade 131 cooperates with the arm 132a of the driven element or portion of the speed responsive device 132. The blade 131 is provided intermediate its ends with a bowed portion 131a with which cooperates the cam 134a mounted on the cam control shaft 134. The blade 131 is electrically connected to one end of a resistance 130, the opposite end of which is connected by wire 130a to the motor 135. The intermediate blade 133 of the switch is connected to wire 133a that extends to the electrical power source for the motor 135. The motor 135 is directly connected to the electrical power source by wire 135a. The blade 137 of the switch is electrically connected to the wire 130a. The blades 131 and 133 are provided with cooperating contacts 136 while the blades 133 and 139 are provided with cooperating contacts 138.

When the manually actuated cam shaft 134 is initially moved in the motor energizing direction the cam 134a moves the blade 131 to engage the cooperating contacts 136 and this completes the circuit to the motor 135 through the resistance 130 to provide the motor with a low voltage starting current. Then as the operator manually rocks the shaft 134 farther to select the desired uniform operating speed for the motor the higher portions of the cam 134a acting on the blade 131 moves the latter still farther toward the blade 133 with a resultant movement of the blade 133 toward the blade 137 to engage the cooperating contacts 138, whereupon full line voltage is now supplied to the motor 135 so the latter will furnish the requisite operating torque, it being understood that at this time the resistance 130 is by-passed. When the speed of the motor exceeds the desired selected speed the driven element of the speed sensitive device will have a torque imparted thereto by the driving element such that the arm 132a will flex the blade 131 upwardly about the bowed portion 131a thereof which is engaged by the cam and such movement of the blade 131 causes the cooperating contacts 138 and 136 to separate momentarily interrupting full line voltage circuit to the motor. Of course as soon as the motor slows down below the selected speed the cooperating contacts again engage for full line voltage energization of the motor.

From the foregoing description of a number of embodiments of the invention it will be seen that the hereinbefore recited objects and advantages are fully accomplished. In the construction embodying the present invention the motor speed controller is extremely simple, is formed of a relatively few number of parts and is so constructed that its dimensions are held to a minimum, thus providing a construction which can be used effectively in apparatus wherein the space is limited as, for example, in sewing machines.

It will also be noted that the speed responsive device of the speed controller is so constructed as not to require separate shafts and bearings for the driven element inasmuch as the driven element or portion is carried entirely by the driving element or portion. Also since the driven element is largely contained within the driving element the diameter and the axial width of the speed responsive device are held to a minimum.

Furthermore, since the driven element of the speed responsive device is carried by and has limited floating fit within the driving element any rotation of the latter, even at the lowest of speeds, will impart immediate rotative movement or torque to the driven element.

The construction of the speed responsive device also provides for self-containment therein of the material having the viscous properties and eliminates the necessity of arranging the speed responsive device in a separate oil container. In addition, the material having the viscous properties not only provides the driving torque between the driving and driven elements of the speed responsive device but also lubricates said elements and maintains the same at relatively low temperature during operation.

The speed responsive device can be adapted for different conditions of operation simply by utilizing therein materials having different viscosities. The motor speed controller is so compact and simple that it can be mounted on the end of the motor shaft or spindle without interfering with the use on said shaft or spindle of a driving gear or pulley and merely by providing the end of the spindle with a threaded centrally disposed axially extending opening into which the attaching bolt for the speed responsive device can be screwed.

Not only can the motor speed controller be mounted directly on the end of the motor shaft or spindle as stated, but it can be mounted on a driven shaft either on the end thereof or with the shaft extending through the speed responsive device.

Although the invention has been described herein as having particular utility in connection with the control of electric drive motors and as utilizing electrical switches, it will be understood that it can readily be adapted for the operation of control valves or other similar control devices for fluid pressure motors and the like.

Although preferred embodiments of the invention have been illustrated and described herein the invention is susceptible of various modifications and adaptations within the scope of the appended claims.

Having thus described my invention, I claim:

1. A speed controller for a power actuated driving device comprising cooperating control elements adapted to control the energization and deenergization of said power device when moved relative to each other to an energizing position, adjustable means acting on said elements with a pressure correlated to a selected speed of operation of said power device to move said elements relative to each other to the energizing position and to maintain said elements in such position, and a speed responsive device having a rotatable driving portion adapted to be actuated by said power device and a driven portion coaxially carried entirely by said driving portion for rotative movement therewith or relative thereto, one of said portions being provided internally with a space in which the other portion is located to provide adjacent cooperating interiorly located surfaces on said portions, one of said surfaces being provided with an annular groove, material having torque transmitting properties located intermediate said adjacent cooperating surfaces and in said groove and confined therebetween solely by said portions, said material acting to transmit to said driven portion from said driving portion varying torques in proportion to varying angular velocities of said driven portion, said control elements being mounted independently of said driving and driven portions, and means carried by said driven portion and operatively associated with said control elements to move said elements relative to each other to the deenergizing position when the torque transmitted to the driven portion by the driving portion exceeds the pressure exerted on said control elements by said adjustable means.

2. A speed controller as defined in claim 1 and wherein said driving portion is provided internally with a space in which the driven portion is located.

3. A speed controller as defined in claim 1 and wherein said control elements are electrically conductive, spaced spring-like blades provided with contact portions that engage each other when said blades are in energizing position but are separated from each other when in deenergizing position.

4. A speed controller as defined in claim 3 and wherein one of said blades is flexed about said adjustable means as a fulcrum by the means carried by said driven portion when said blades are moved by the driven portion relatively to each other to the deenergizing position to separate said contact portions.

5. A speed controller as defined in claim 3 and wherein said blades are located laterally of said speed responsive device.

6. A speed controller as defined in claim 3 and wherein said blades are spaced axially with respect to said speed responsive device.

7. A speed controller as defined in claim 3 and wherein said blades are arcuate and are located radially outwardly of said speed responsive device and substantially concentric thereto.

8. A speed controller as defined in claim 1 and wherein said means carried by said driven portion and operatively associated with said control elements is an arm projecting from said driven portion.

9. A speed controller as defined in claim 3 and wherein said blades are spaced axially with respect to said speed responsive device and with one of said blades provided with a follower roller while said means carried by said driven portion is an arm extending axially of said speed responsive device and provided with a V-shaped camming notch cooperating with said roller.

10. A speed controller as defined in claim 3 and wherein said blades are arcuate in shape and substantially concentric to said speed responsive device and are spaced radially outwardly thereof with one of said blades being provided with a cam block having a V-shaped camming notch therein while said means carried by said driven portion is a follower roller mounted on the periphery of said driven portion and cooperating with said camming notch.

11. In a speed controller for a driving shaft actuated by a power device and including means operatively associated with said device for controlling the operating energization and deenergization thereof; the improvement which comprises a speed responsive device having a driving portion fixed to and coaxial with said driving shaft and provided with an annular channel extending radially inwardly from its circumference, a ring-like driven portion entirely carried by said driving portion and located in said channel and having in all directions a limited floating fit therein and provided on its circumference with an annular rim of substantially the same width as the axial width of the circumference of the driving portion and overlying the circumference of the driving portion, said driven portion adjacent its circumference being provided with means adapted to be operatively associated with said control means to operate the same, and material having torque transmitting properties located intermediate the adjacent surfaces of said portions and confined therein solely by said portions wherefore varying torques will be transmitted to said driven portion from said driving portion in proportion to varying angular velocities of said driving portion to cause speed governing operation of said control means by said driven portion.

12. The improvement in a speed controller as defined in claim 11 and wherein one of said portions within the annular channel of the driving portion is provided with annular grooves which contain the material having torque transmitting properties that is located intermediate the adjacent surfaces of said portions.

13. The improvement in a speed controller as defined in claim 11 and wherein said driven portion within said channel in the driving portion is provided on its opposite sides with annular grooves containing the material that is located intermediate the adjacent surfaces of said portions.

14. The improvement in a speed controller as defined in claim 11 and wherein the means adjacent the circumference of the driven element which is adapted to be operatively associated with the control means includes an arm extending laterally of the driven element.

15. The improvement in a speed controller as defined in claim 11 and wherein the means provided adjacent the circumference of the driven element that is adapted to be operatively associated with the control means includes an axially extending arm provided with a V-shaped camming notch.

16. The improvement in a speed controller as defined in claim 11 and wherein the means provided adjacent the circumference of the driven member that is adapted to be operatively associated with the control means includes a cam follower roller supported by the driven portion radially outwardly of the circumference of the latter.

17. The improvement in a speed controller as defined in claim 11 and wherein said driving portion includes a part having a central hub provided with an annular flange forming one side of the channel in said driving portion and a separate part forming the other side of said channel.

18. The improvement in a speed controller as defined in claim 11 and wherein said driving portion includes a part having a hub through which the driving shaft extends and adapted to be secured to said shaft, said hub being provided with a radially extending annular flange forming one side of said channel, said hub also having a reduced threaded cylindrical portion axially spaced from said flange, and a separate part in the form of an internally threaded ring screwed on said threaded reduced portion of said hub and forming the other side wall of said channel.

19. A speed controller for a driving shaft actuated by a power device and comprising means adapted to be operatively associated with said device for controlling operating energization and deenergization thereof, a speed responsive device having a driving portion adapted to be coaxially fixed to said driving shaft and provided with an annular channel extending radially inwardly from its circumference, a ring-like driven portion entirely carried by said driving portion and located in said chamber and having in all directions a limited floating fit therein and provided at its circumference with means overlying the circumference of the driving portion, said driven element adjacent its circumference being provided with means that cooperates with and actuates and controls the means operatively associated with the power device, said means operatively associated with the power device being mounted and supported independently of said driving and driven portions, and material having torque transmitting properties located intermediate the adjacent surfaces of said portions and confined therein solely by said portions wherefore varying torques will be transmitted to said driven portion from said driving portion in proportion to varying angular velocities of said driving portion to cause governing operation of said control means by said driven portion.

20. A speed controller as defined in claim 19 and wherein said means that is operatively associated with the power device for controlling the operating energization and deenergization thereof includes spaced spring-like switch blades provided with cooperating contacts while said means provided on said driven portion adjacent the circumference of the latter cooperates with one of said spring blades.

21. A speed controller as defined in claim 20 and wherein adjustable means is provided for exerting pressure on the spring blade that cooperates with the means provided adjacent the circumference of the driven portion to maintain the contacts of said blades closed with a predetermined pressure, said means adjacent the circumference of the driven portion acting on said blade upon a predetermined torque being imparted to said driven portion by said driving portion to flex said blade about the pressure applying means as a fulcrum to separate said contacts.

22. A speed controller as defined in claim 1 and wherein said material having torque transmitting properties is a viscous material.

23. The improvement in a speed controller as defined in claim 11 and wherein said material having torque transmitting properties is a viscous material.

24. A speed controller as defined in claim 19 and wherein said material having torque transmitting properties is a viscous material.

References Cited in the file of this patent

UNITED STATES PATENTS

| 1,677,008 | Townsend | July 10, 1928 |
| 1,947,332 | Christen | Feb. 13, 1934 |
| 2,125,055 | Taliferro | July 26, 1938 |
| 2,228,625 | Geibig et al. | Jan. 14, 1941 |
| 2,488,629 | Kline | Nov. 22, 1949 |